United States Patent
Matubara et al.

[11] Patent Number: 5,831,239
[45] Date of Patent: *Nov. 3, 1998

[54] LASER WELDING METHOD

[75] Inventors: Setuo Matubara; Masaru Kanaoka, both of Aichi, Japan

[73] Assignee: Mitsubishi Denki Kabushiki Kaisha, Tokyo, Japan

[*] Notice: The term of this patent shall not extend beyond the expiration date of Pat. No. 5,618,452.

[21] Appl. No.: 668,820

[22] Filed: Jun. 24, 1996

Related U.S. Application Data

[63] Continuation of Ser. No. 90,453, Jul. 13, 1993, Pat. No. 5,618,452.

[30] Foreign Application Priority Data

Jul. 14, 1992 [JP] Japan ............... P.HEI 4-186918
Jun. 30, 1993 [JP] Japan ............... P.HEI 5-162806

[51] Int. Cl.⁶ .................................................. B23K 26/12
[52] U.S. Cl. ................................................... 219/121.64
[58] Field of Search ................... 219/121.63, 121.64, 219/121.84

[56] References Cited

U.S. PATENT DOCUMENTS

| | | |
|---|---|---|
| 4,139,758 | 2/1979 | Pinfold . |
| 4,252,866 | 2/1981 | Matsudo et al. .............. 428/659 |
| 4,308,446 | 12/1981 | Okane et al. . |
| 4,577,088 | 3/1986 | Sharp ............................ 219/121.64 |
| 4,601,801 | 7/1986 | Fukuda et al. ................. 204/206 |
| 4,634,832 | 1/1987 | Martyr .......................... 219/121.63 |
| 4,642,466 | 2/1987 | Pennington ................... 219/121.64 |
| 4,650,954 | 3/1987 | Frings et al. .................. 219/121.64 |
| 4,684,779 | 8/1987 | Berlinger et al. ............. 219/121.64 |
| 4,873,415 | 10/1989 | Johnson et al. ............... 219/121.64 |
| 4,905,310 | 2/1990 | Ulrich ........................... 219/121.64 |
| 4,945,207 | 7/1990 | Arai ............................... 219/121.84 |
| 5,182,171 | 1/1993 | Aoyama et al. ............... 428/623 |
| 5,183,989 | 2/1993 | Sanders et al. ................ 219/121.64 |
| 5,183,992 | 2/1993 | Bilge et al. ................... 219/121.64 |
| 5,187,346 | 2/1993 | Bilge et al. ................... 219/121.64 |
| 5,221,823 | 6/1993 | Usui .............................. 219/121.63 |
| 5,237,151 | 8/1993 | Maruyama .................... 219/121.84 |
| 5,389,761 | 2/1995 | Kresse, Jr. ..................... 219/121.63 |
| 5,539,180 | 7/1996 | Mori et al. .................... 219/121.64 |

FOREIGN PATENT DOCUMENTS

| | | |
|---|---|---|
| 527229 | 2/1993 | European Pat. Off. . |
| 3843841 | 6/1990 | Germany ...................... 219/121.64 |
| 58-93592 | 6/1983 | Japan . |
| 61-150794 | 11/1986 | Japan . |
| 62-55478 | 3/1987 | Japan . |
| 62-254992 | 11/1987 | Japan . |
| 63-299884 | 12/1988 | Japan . |
| 2-92486 | 4/1990 | Japan . |
| 3-66490 | 3/1991 | Japan . |
| 1512782 | 6/1978 | United Kingdom . |
| 9102621 | 3/1991 | WIPO . |

OTHER PUBLICATIONS

*American Institute of Physics Handbook*, pp. 2–134 by Gray, Dec. 1972.

*Primary Examiner*—Geoffrey S. Evans
*Attorney, Agent, or Firm*—Sughrue, Mion, Zinn, Macpeak & Seas, PLLC

[57] ABSTRACT

A laser welding method which provides improved welding quality, allowing excellent products to be produced. The mixture of inactive gas or nitrogen gas and 5% to 35% of oxygen gas in terms of volume ratio and that of inactive gas or nitrogen gas and not less than 25% of dried air in terms of volume ratio are employed as an assist gas in the lap and butt weldings and filler wire-inserted welding of metal materials filmed with low melting point substance.

2 Claims, 4 Drawing Sheets

LASER WELDING METHOD

This is a continuation of application Ser. No. 08/090,453 filed Jul. 13, 1993 now U.S. Pat. No. 5,618,452.

BACKGROUND OF THE INVENTION

1. Field of the Invention

The present invention relates to a laser welding method, materials and apparatus for welding materials coated with a film of a low melting point substance by the application of a laser beam and the injection of an assist gas.

2. Description of the Background Art

In lap welding by means of a laser beam, a laser beam with sufficient energy density to weld materials is applied to material surfaces that are closely lapped without spacing. At the same time, assist gas is injected to enhance a cooling effect around the welding spot, to protect the laser beam lens from metal evaporation and from molten metal, and to protect the weld zone from ambient air, which tends to decrease welding quality. However, such a method is adequate for the welding of single materials which do not having film layers on their surfaces. Problems arise if the metal materials to be welded are those having films made of substances lower in melting point than their base material, e.g., galvanized steel plates, or if the metal material is welded in close contact, as described above, with an unfilmed steel plate with the film layers located inside. Specifically, the zinc which has a low melting point of 420° C. will vaporize while the steel is in a molten state. This will cause the occurrence of an explosion during welding with the laser beam, the splashing of the weld zone, and the formation of a hole, especially on the laser application side, thereby resulting in an unfavorable welding quality.

To cope with this problem, one conventional solution is to provide a space between the joint surfaces of fused members to be lapped. For example, FIG. 7 shows an approach taught in Japanese Laid-Open Patent Publication No. 55478 of 1987 wherein a space is provided in a weld zone. Referring to FIG. 7, the numerals 1 and 2 indicate fused members, 1a, 1b and 2a, 2b represent galvanized layers of the fused members 1 and 2, respectively, 9 designates a space provided between the joint surfaces of the fused members 1 and 2, 6 denotes a laser beam, 7 indicates assist gas, and 4 indicates a fuse zone.

FIG. 9 is a schematic diagram of a laser beam head which applies a laser beam and injects assist gas to materials to be welded. In FIG. 9, 1 indicates materials to be welded (fused members); 6 a laser beam, 7 an assist gas; 12 a laser beam lens; 13 an adjustment mechanism for the laser beam lens 12; 5 a nozzle from which a laser beam 6 and assist gas 7 are applied and injected and 15 denotes an adjustment mechanism of a nozzle.

The operation of the conventional design shown in FIG. 7 will now be described. In FIG. 7, the fused members 1 and 2 are lapped and comprise galvanized steel plates of 0.4 mm thickness having the galvanized layers 1a, 1b and 2a, 2b on their front and back surfaces, respectively. A recess 10 of 50 μm depth is formed in part of the joint surface of the lower fused member 2 of the lapped members. By lapping the two members, the blocked up space 9 is formed by the recess 10. This space 9 is a portion where the two members are to be welded, and has a wider area than the fuse zone of the two members resulting from welding. With the exception of this space 9, the two members are in total contact with each other.

The laser beam 6 is applied to the fused members 1, 2 (formed as described above) toward the space 9 from the fused member 1 side, whereby the fused members 1, 2 are welded. In this welding, the galvanized layer 1a on which the laser beam 6 is applied produces an explosive phenomenon, since it gasifies almost instantaneously and escapes to the outside. The galvanized layers 1b and 2a are opposed to each other with the space 9 in between. With this arrangement, an explosive phenomena similar to one produced by the galvanized layer 1a will be caused. However, most of the gasified layer material will expand without mixing into the fuse zone 4 that is generated by the application of the laser beam to the fused members 1, 2. Since the recess 10 has a wider area than the fuse zone 4, it acts as a contained volume into which the evaporated matter, comprising mainly the galvanized layers 1b, 2a, can enter. This containment will prevent a hole-making phenomenon from occurring during laser welding.

FIG. 8 shows a known welding method wherein a filler wire is inserted. In FIG. 8, 1 and 2 indicate fused members, 1a, 1b and 2a, 2b denote galvanized layers of the fused members 1 and 2, respectively, 6 represents a laser beam, 8 designates a filler wire, and 4 and 11 indicate fuse zones.

The operation of the method shown in FIG. 8 will now be described. Referring to FIG. 8, the fused members 1 and 2 to be welded are galvanized steel plates of 0.8 mm thickness having the galvanized layers 1a, 1b and 2a, 2b on their front and back surfaces, respectively, and are disposed in a "butted" form. The laser beam 6 is applied to the top surface. At the same time, the filler wire 8 is inserted into the top surface of the butted position, whereby the fused members 1, 2 are laser welded. The diameter and feedrate of the filler wire 8 will depend on the gap between the butted members, the thickness of the fused members and the kind of fused member that is utilized. As the materials are made thicker and/or the gap is made larger, a larger diameter wire is required, but the feedrate is smaller. Also, as the galvanized layers 1a, 1b and 2a, 2b become thicker, molten metal from the filler wire and the fused members settle into each other more poorly, causing the fuse zone 4 to be disturbed or splash. This will cause deposits 11 to stick to the welded member surfaces.

Since the laser welding method known in the art operates as described above, an explosive phenomenon caused by vaporized zinc can be prevented when there is welding of galvanized steel plates whose base materials have been filmed with zinc, a low melting point substance. However, this process is more expensive and time consuming since the work of recessing parts to be welded is added to the welding process. Furthermore, the recess must be detected and the beam application position located exactly prior to welding. In addition, a swell is made on the back side of the joint portion, thereby harming the appearance of a product. Further, since the amount of zinc that is gasified will increase in proportion to the increase in zinc used for galvanization, the volume of the space 9 must be changed in response to that increase.

Furthermore, the welding method wherein the filler wire is inserted has disadvantages in that an uneven bead in the fuse zone reduces welding strength and that a postprocess for removing molten metal sticking to the surface is required.

SUMMARY OF THE INVENTION

It is, accordingly, an object of the present invention to overcome the disadvantages in the background art by providing a laser welding process which will eliminate a welding fault due to the presence of low melting point material on a base metal.

It is a further object to eliminate such problems in piercing and non-piercing weldings.

It is yet another object to eliminate such problems where there is filler wire-inserted welding at the lap or butt joint of materials filmed with low melting point substances.

The embodiments of the invention achieve a laser welding method which has improved in welding quality, allowing excellent products to be produced. The mixture of inactive gas or nitrogen gas and 5% to 35% of oxygen gas in terms of volume ratio and that of inactive gas or nitrogen gas and not less than 25% of dried air in terms of volume ratio are employed as an assist gas in the lap and butt weldings and filler wire-inserted welding of metal materials filmed with low melting point substance.

DESCRIPTION OF THE PREFERRED EMBODIMENTS

Figure 1:
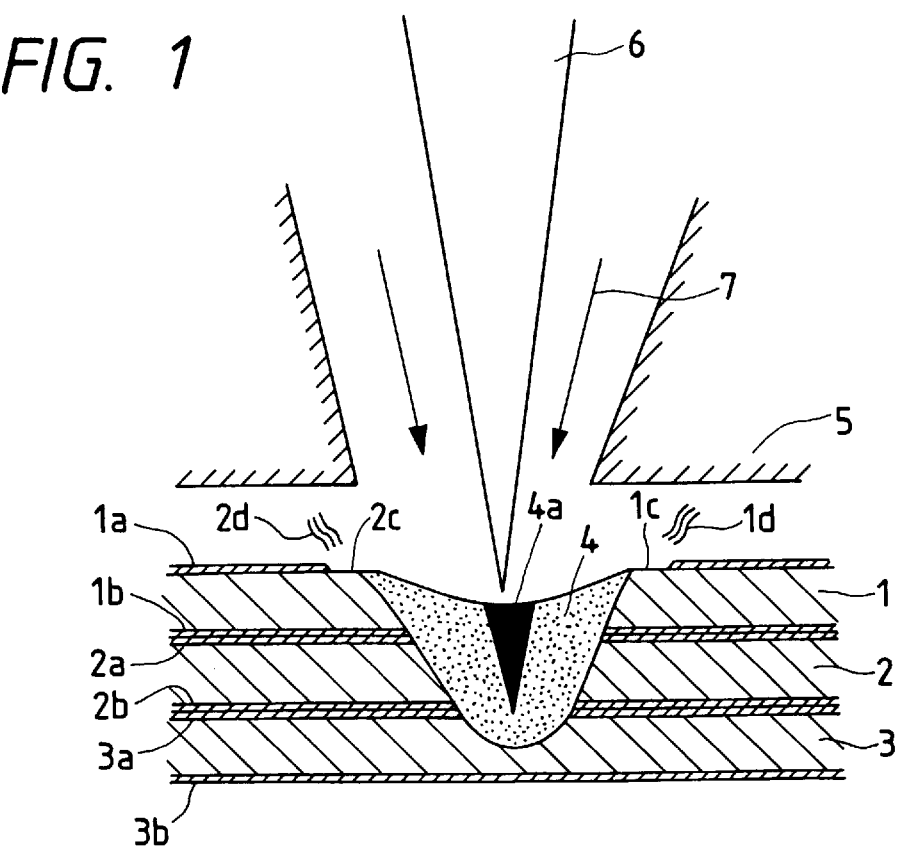
FIG. 1 is a schematic diagram of a butt welding process which employs a mixed gas, including oxygen gas or dried air as an assist gas, in accordance with a preferred embodiment of the invention.

An embodiment of the invention will now be described in accordance with FIG. 1, wherein reference characters identical to those in the conventional methods designate identical or corresponding parts. FIG. 1 shows lap welding of plates having film layers of low melting point material, wherein the numerals 1, 2 and 3 indicate steel plates serving as the base materials of fused members, 1a, 1b, 2a, 2b, 3a and 3b designate layers galvanized onto the surfaces of the fused member base materials 1, 2 and 3. In addition, 1c and 2c are the areas where the zinc film or galvanization came off, 1d and 2d are galvanization vapor, 6 denotes a laser beam, 4a indicates a key hole created by evaporation of fused members when the laser beam 6 is applied, 4 represents a fuse zone, 7 indicates an assist gas injected onto the welded members simultaneously with the application of the laser beam 6, and 5 denotes a nozzle for the injection of the assist gas 7 and the application of the laser beam 6.

The assist gas 7 injected concurrently with the application of the laser beam 6 is any of several mixtures of gases. For example, the assist gas may be a mixture of argon and oxygen gases, a mixture of nitrogen and oxygen gases, a mixture of helium and oxygen gases or a mixture of air with any of argon gas, nitrogen gas and helium gas. The assist gas includes 5% to 35% of oxygen gas in terms of volume ratio in a first embodiment of the invention and not less than 25% of dried air in terms of volume ratio in the second embodiment of the invention. Of course, the assist gas including 5% to 35% of oxygen gas or that which includes not less than 25% of dried air, as discussed in the first and second embodiments of the invention, can be employed when the laser beam is used to weld only one material having a film layer made of a substance lower in melting point than a base material (i.e., as opposed to butt welding or lap welding two materials).

Figure 7:
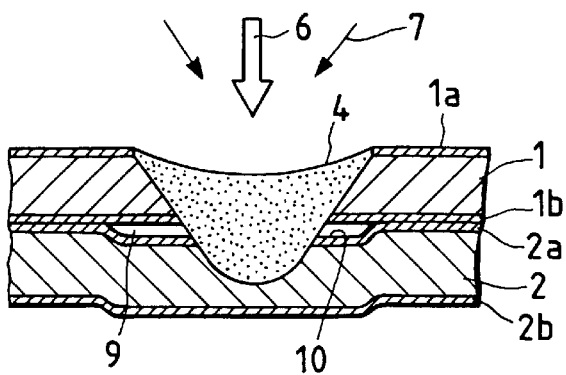
FIG. 7 illustrates lap welding according to a known process.
Figure 9:
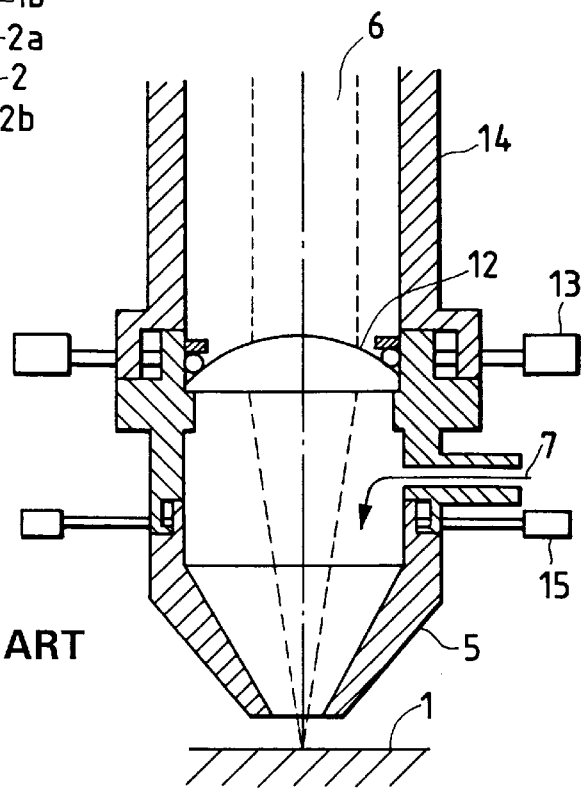
FIG. 9 illustrates a conventional arrangement of a laser welding nozzle and workpiece.
Figure 8:
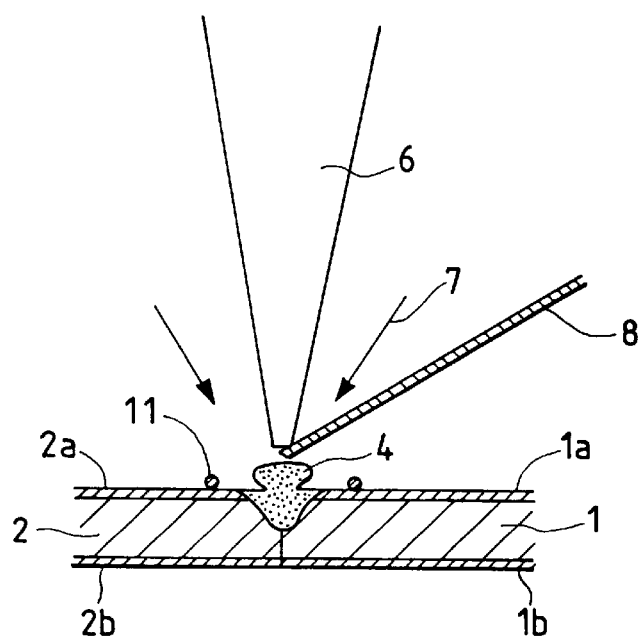
FIG. 8 illustrates welding according to a known process wherein a filler wire is inserted.

The operation of the first embodiment will now be described. In the present embodiment, since oxygen gas is included in the assist gas, the galvanized layers are oxidized and burn because of the oxygen gas component. Accordingly, the explosive phenomenon which is caused by vaporization through heat transmission from laser beam application areas will not be observed when an assist gas which includes oxygen gas is used. Further, the entry point of a key hole produced at the laser beam application portion will expand due to the oxidation reaction. This makes it easier for the vaporized galvanization that is generated at the lapped portion to escape to the exterior. Therefore, not only the lapped surfaces provided with a space as shown in FIG. 7 but also lapped surfaces in close contact without any gap can be welded properly.

Figure 2:
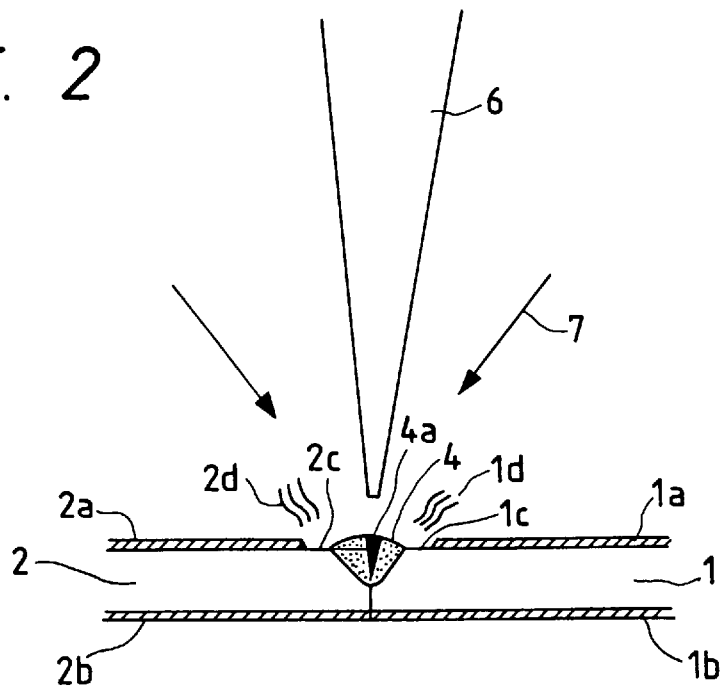
FIG. 2 illustrates an example of a butt welding process for galvanized steel plates which employs mixed gas, including oxygen gas or dried air as assist gas, in accordance with another embodiment of the invention.

A second embodiment of the invention will now be described in accordance with FIG. 2. FIG. 2 shows a welding example of the butted portion of electrogalvanized steel plates. In the present embodiment, the assist gas employed is a mixture of argon gas and 10% of oxygen gas.

In FIG. 2, when an assist gas including oxygen and a laser beam with high energy density is injected onto the surfaces where fused members 1 and 2 having galvanized layers 1a, 1b, 2a and 2b are butted, areas 1c and 2c emerge where galvanized layers 1a and 2a in the vicinity of fuse zone 4 are oxidized and removed. By the application of a laser beam 7, materials to be welded are evaporated at 1d and 2d and a key hole 4a is formed. As welding on the basis of the laser beam proceeds, molten metal fills in a key hole 4a and joint portion at the fuse zone 4 is formed.

Figure 5:
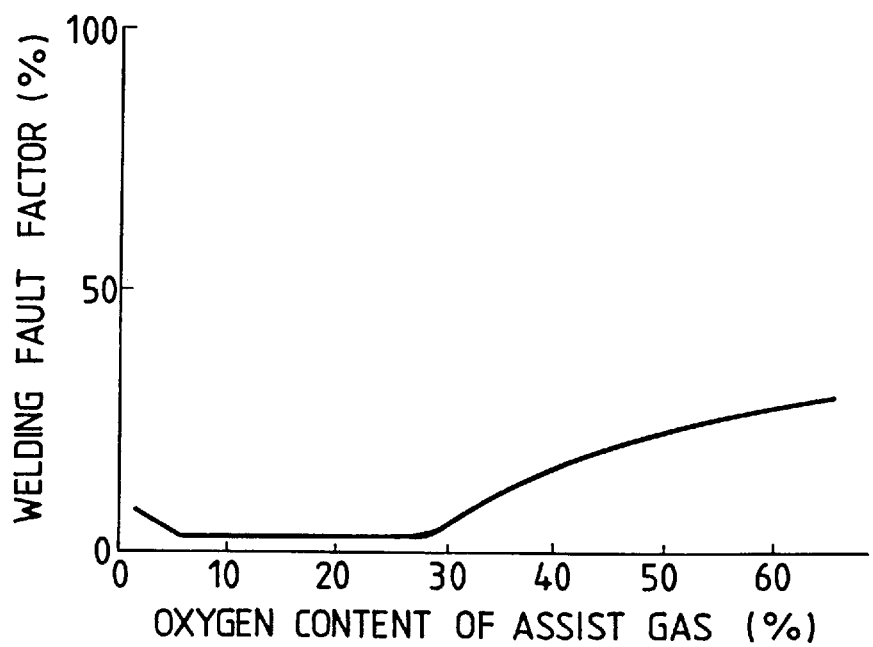
FIG. 5 illustrates the influence of the oxygen content of the assist gas on the welding fault factor in the butt welding of electrogalvanized steel plates.

The influence of oxygen gas concentration in the assist gas on welding quality will now be described in accordance with the results of experiments. FIG. 5 illustrates a relationship between the oxygen content of an argon gas-based assist gas including oxygen gas and the fault factor of welding quality in the welding example of FIG. 2. While welding faults take place at the ratio greater than 10% where the assist gas has a 0% oxygen content in accordance with the conventional approach to a purely inert environment, the fault factor is less than 10% at the oxygen content of 5% to 35%. Further, when the oxygen gas content is raised in excess of 35%, the oxidation of the welded members increases steeply, deteriorating welding strength. Finally, at the oxygen content of less than 5%, the degree of oxidation is low, causing the molten metal to swell or splash.

Whereas FIG. 5 shows the experiment results of a 40 g/m$^2$ galvanization amount, an improvement effect is more remarkable as the galvanization amount increases.

Figure 3:
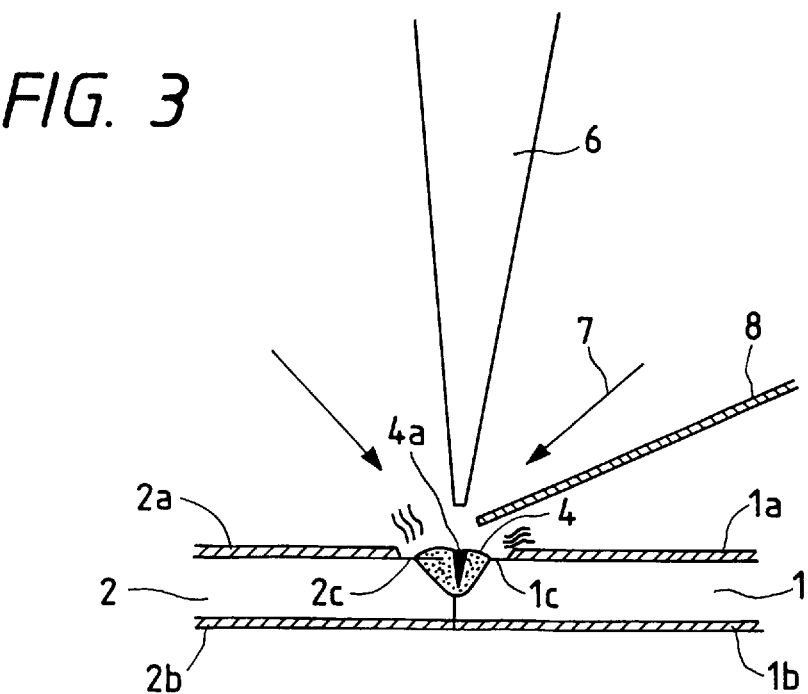
FIG. 3 provides an example of a process for butt welding galvanized steel plates carried out by inserting a filler wire and using mixed gas, including oxygen gas or dried air as assist gas, in accordance with an embodiment of the present invention.

Another embodiment of the invention will now be described in accordance with FIG. 3. FIG. 3 shows a welding example wherein a filler wire is inserted into the butted portion of electrogalvanized steel plates. In the present embodiment, the assist gas employed is a mixture of argon gas and 10% of oxygen gas.

The third embodiment in FIG. 3 is different from the second embodiment in FIG. 2 in that the filler wire 8 is employed at a point where the fused members 1 and 2 having the galvanized layers 1a, 1b and 2a, 2b, respectively, are butted at the beam condensing point of the laser beam. Since the oxygen gas component in the assist gas also oxidizes and separates the galvanized layers in the present embodiment, the molten metal settles in properly, providing a smooth welding bead.

Figure 6:
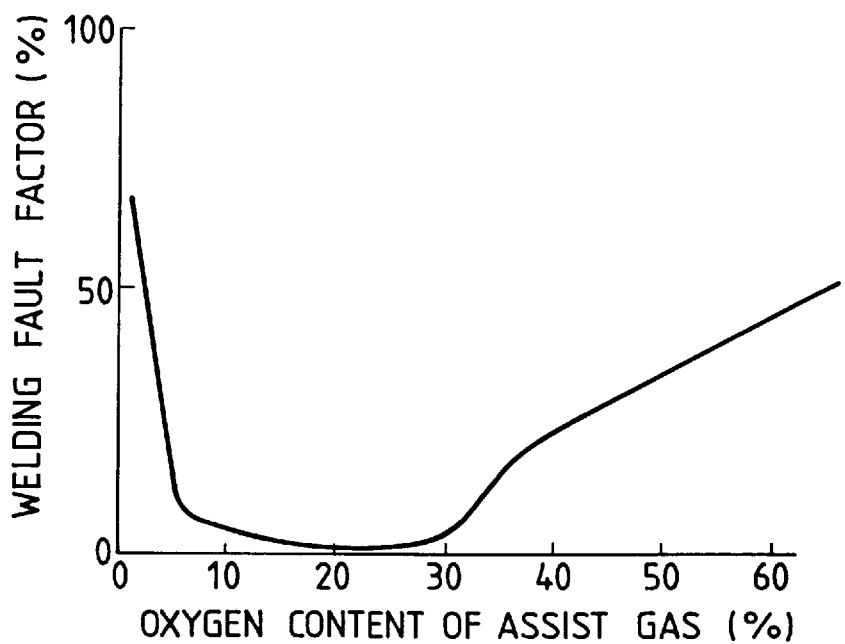
FIG. 6 illustrates the influence of the oxygen content of the assist gas on a welding fault factor in the butt welding of electrogalvanized steel plates using the filler wire.

FIG. 6 illustrates a relationship between the oxygen content of the assist gas based on argon gas and the fault factor of welding quality in the welding example of FIG. 3. While welding faults take place at the ratio of approximately 70% at the 0% oxygen content of the assist gas, the fault factor is less than 10% at the oxygen content of 5% to 35%. Further, when the oxygen content is raised, the welding fault factor conversely increases due to overoxidation. When the oxygen gas content is raised in excess of 35%, the oxidation of the welded members increases steeply, deteriorating welding strength. Reversely, at the oxygen content of less than 5%, the degree of oxidation is low, causing the molten metal to swell or splash. As is clear from a comparison with FIG. 5, the fault factor is relatively higher when the filler wire is employed than when the filler wire is not employed in either of the ranges where the oxygen content is less than 5% and where it is not less than 35%.

Whereas FIG. 6 shows the experimental results of a 40 g/m$^2$ galvanization amount, an improvement effect is also more remarkable in this case as the galvanization amount increases, as in FIG. 5.

Figure 4:
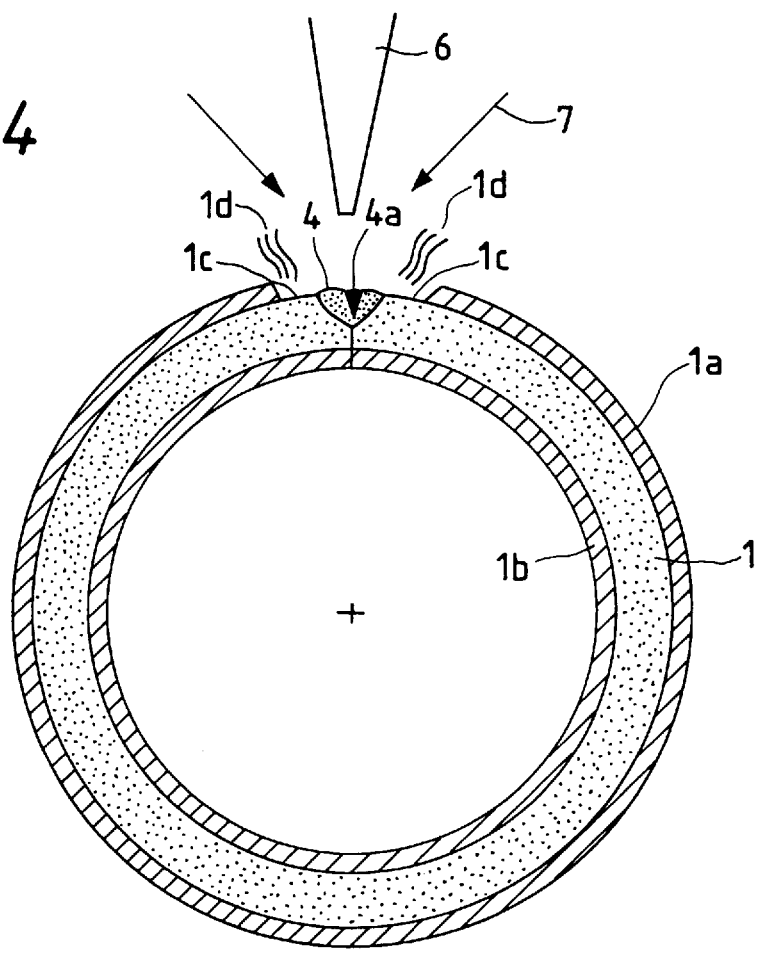
FIG. 4 provides an example of seamless welding galvanized steel pipes as a further embodiment of the invention.

FIG. 4 shows another embodiment of the invention. The present embodiment, which shows the seamless welding of galvanized steel plates, is identical to the second embodiment with the exception that both ends of the same material are butt welded.

The effect of the present embodiment on the electrogalvanized steel plates described herein is also provided equally on any of molten galvanized, molten aluminum plated, and tin plated steel plates.

It will be apparent that the four different embodiments of the invention, as described above, achieve a laser welding method which has improved in welding quality, allowing excellent products to be produced. The mixture of inactive gas or nitrogen gas and 5% to 35% of oxygen gas in terms of volume ratio and that of inactive gas or nitrogen gas and not less than 25% of dried air in terms of volume ratio are employed as an assist gas in the lap and butt weldings and filler wire-inserted welding of metal materials filmed with low melting point substance.

The entire disclosure of each and every foreign patent application from which the benefit of foreign priority has been claimed in the present application is incorporated herein by reference, as if fully set forth.

Although this invention has been described in at least one preferred embodiment with a certain degree of particularity, it is to be understood that the present disclosure of the preferred embodiment has been made only by way of example and that numerous changes in the details and arrangement of components may be made without departing from the spirit and scope of the invention as hereinafter claimed.

We claim:

1. A method for laser welding at least one material, comprising the steps of:

providing at least one material having a weld zone and a galvanized film layer thereon made of a substance lower in melting point than a base material;

applying a laser beam to said weld zone of said at least one material; and injecting to the weld zone, concurrently with the application of said laser beam, an assist gas comprising a mixture of an inactive gas and not less than 25% of dried air filtered for moisture and oil in terms of volume ratio to the whole assist gas.

2. A method as claimed in claim 1, wherein said galvanization amount of said galvanized film layer is 40 g/m$^2$.

* * * * *